United States Patent
Masuda et al.

(10) Patent No.: US 6,177,966 B1
(45) Date of Patent: Jan. 23, 2001

(54) IMAGE DISPLAY HAVING CONTROL SYSTEM FOR PERIODICALLY EFFECTING A CHANGE OF POSITION OF VIRTUAL IMAGE

(75) Inventors: Tomohiko Masuda; Kenichi Wada, both of Takatsuki; Yuji Kamoda, Ibaraki, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/052,228

(22) Filed: Mar. 31, 1998

(30) Foreign Application Priority Data

Apr. 4, 1997 (JP) .................................................. 9-086245

(51) Int. Cl.⁷ .......................... G02F 1/1335; G03B 21/60; G09G 5/00

(52) U.S. Cl. ................... 349/8; 349/11; 349/15; 359/458; 345/7

(58) Field of Search .............................. 349/8, 9, 11, 15; 359/458, 630; 345/7, 121, 8

(56) References Cited

U.S. PATENT DOCUMENTS

| | | | |
|---|---|---|---|
| 3,923,370 | 12/1975 | Mostrom | 350/55 |
| 4,902,083 | 2/1990 | Wells | 350/6.6 |
| 5,421,589 | * 6/1995 | Monroe | 273/437 |
| 5,579,026 | * 11/1996 | Tabata | 345/8 |
| 5,684,497 | * 11/1997 | Hildebrand et al. | 345/8 |
| 5,701,132 | * 12/1997 | Kollin et al. | 345/8 |
| 5,739,797 | * 4/1998 | Karasawa et al. | 345/8 |
| 5,896,226 | * 4/1999 | Peuchot et al. | 349/15 |
| 5,917,460 | * 6/1999 | Kodama | 345/8 |
| 5,973,845 | * 10/1999 | Hidebrand et al. | 359/630 |

FOREIGN PATENT DOCUMENTS

| | | |
|---|---|---|
| 7-30928 | 1/1995 | (JP) . |
| 8-257077 | 10/1996 | (JP) . |

\* cited by examiner

Primary Examiner—William L. Sikes
Assistant Examiner—Tarifur R. Chowdhury
(74) Attorney, Agent, or Firm—Sidley & Austin

(57) ABSTRACT

A liquid crystal panel displays an image, while a lens projects, as a virtual image, an image displayed by the liquid crystal panel. A control system controls either the liquid crystal panel or the lens so as to periodically effect a changing of the position of the virtual image, each changing occurring over a predetermined time period. The control can be accomplished by changing the position of the liquid crystal panel or of the lens along an optical axis at a speed of less than 0.1 mm/sec so as to avoid burdening the eye of the observer. The motion can be at a uniform speed through most of the range of the motion, while permitting a slowing down to a stop at each end of the range and then an acceleration to the uniform speed in the opposite direction. A rest period (i.e., a full stop for a period of time) can be provided at one or both ends of the motion range, either for each cycle of motion or after the occurrence of a plurality of such cycles. When used in a situation in which the size of the viewed image is of particular importance, the size of the display region can be changed so that the apparent image size remains constant with a change in the position of liquid crystal panel.

25 Claims, 3 Drawing Sheets

POSITION OF THE
OBSERVED IMAGE:L(mm)

POSITION OF THE ACTUAL IMAGE:L'(mm)

IMAGE DISPLAY HAVING CONTROL SYSTEM FOR PERIODICALLY EFFECTING A CHANGE OF POSITION OF VIRTUAL IMAGE

RELATED APPLICATION

This application is based on Japanese Patent Application 09-086245, filed in Japan on Apr. 4, 1997, the content of which is hereby incorporated herein in its entirety by reference.

FIELD OF THE INVENTION

The present invention relates to a display suitable for use in a virtual reality device in order to observe a projected image as a virtual image.

BACKGROUND OF THE INVENTION

FIG. 1 shows an example of the construction of a conventional head-mounted display (HMD), which is one type of virtual reality device. In order for an eye 3 of an observer to view a virtual image, an actual image is displayed on a liquid crystal panel 1, which is illuminated by a backlight 4. In FIG. 1 the virtual image is viewed at infinity by the observer's eye 3 because the liquid crystal panel 1 is disposed at the focal point position of the lens 2. In general, head-mounted devices are constructed so as to form an image at a distance in the range of 25 cm to infinity.

It has been proposed to allow a changing of the positions of the liquid crystal panel 1 and the lens 2 so as to adjust the position of the image to match the diopter of the observer 3 (first conventional example). Japanese Laid-Open Patent Application No. 7-30928 discloses an arrangement wherein the diopter is changed by moving the focal point in conjunction with the perspective of an image so as to controllably move the image display device (i.e., liquid crystal panel 1) forwarde and backwarde in accordance with the parallax of the displayed image (second conventional example).

However, the first conventional example normally provides that an observer continues to view the image at a fixed position insofar as the observer cannot himself optionally change the position of the image. Particularly when this viewing state continues over a long period of time, the observer's eyes become fatigued so as to cause a concern as to possible vision impairment. The second conventional example of a display described above is capable of reducing eye fatigue to some degree, but requires a complex construction which is necessary to control the position of the image display device in accordance with the displayed image. Furthermore, when the image parallax does not change, the image continues to be viewed at the same image position. In this situation, the resulting eye fatigue is similar to that of the first conventional example.

SUMMARY OF THE INVENTION

An object of the present invention is to provide a display having a simple construction. Another object of the present invention is to provide a display which prevents eye fatigue. Another object of the present invention is to provide an improved display which is suitable for use in virtual reality devices in order to observe a projected image as a virtual image.

The present invention attains the aforesaid objects by providing a construction comprising:

an image display device for displaying an image;

an optical system for projecting, as a virtual image, an image displayed by the image display device; and a control system for controlling at least one of the image display device and the optical system so as to periodically effect a changing of the position of the virtual image, which is projected by the optical system, each changing occurring over a predetermined time period.

According to this construction, an observer views a projected image which normally changes position during viewing. That is, the virtual image is not viewed continuously at only one point even when the viewing by the observer continues over a long period of time.

In a presently preferred embodiment, the position of the liquid crystal panel or of a lens in the optical system is moved along the optical axis at a speed of less than 0.1 mm/sec so as to avoid burdening the eye of the observer. The motion can be at a substantially uniform speed through most of the range of the motion, while permitting a slowing down to a full stop at each end of the range and then an acceleration to the uniform speed in the opposite direction. In one embodiment, a rest period (i.e., a full stop for a period of time) can be provided at one or both ends of the motion range, either for each cycle of motion or after the occurrence of a plurality of such cycles.

When the display of the present invention is used in a situation in which the size of the viewed image is of particular importance, the size of the display region can be changed so that the apparent image size remains constant with a change in the position of liquid crystal panel 1.

DESCRIPTION OF THE PREFERRED EMBODIMENTS

Figure 1:
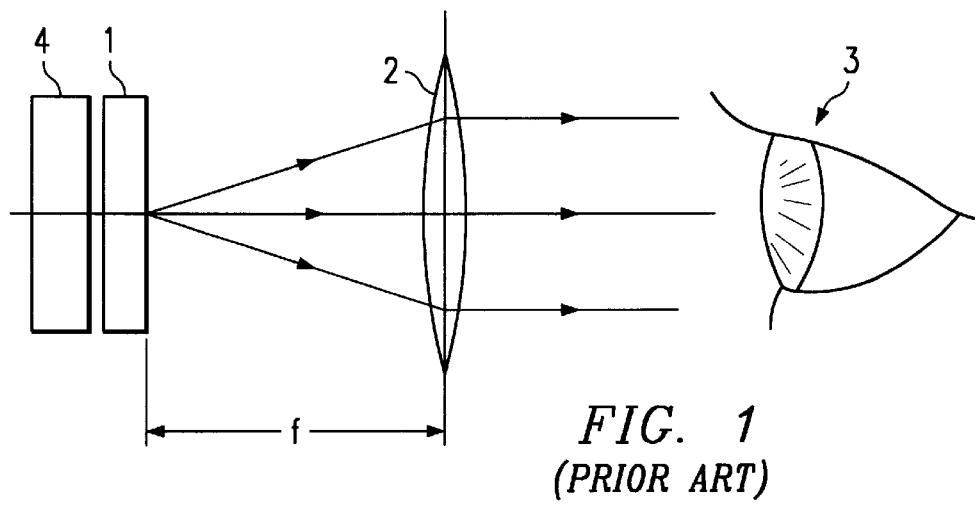
FIG. 1 is a schematic diagram showing the optical relationship of the elements of a conventional head-mounted device (HMD)
Figure 2:
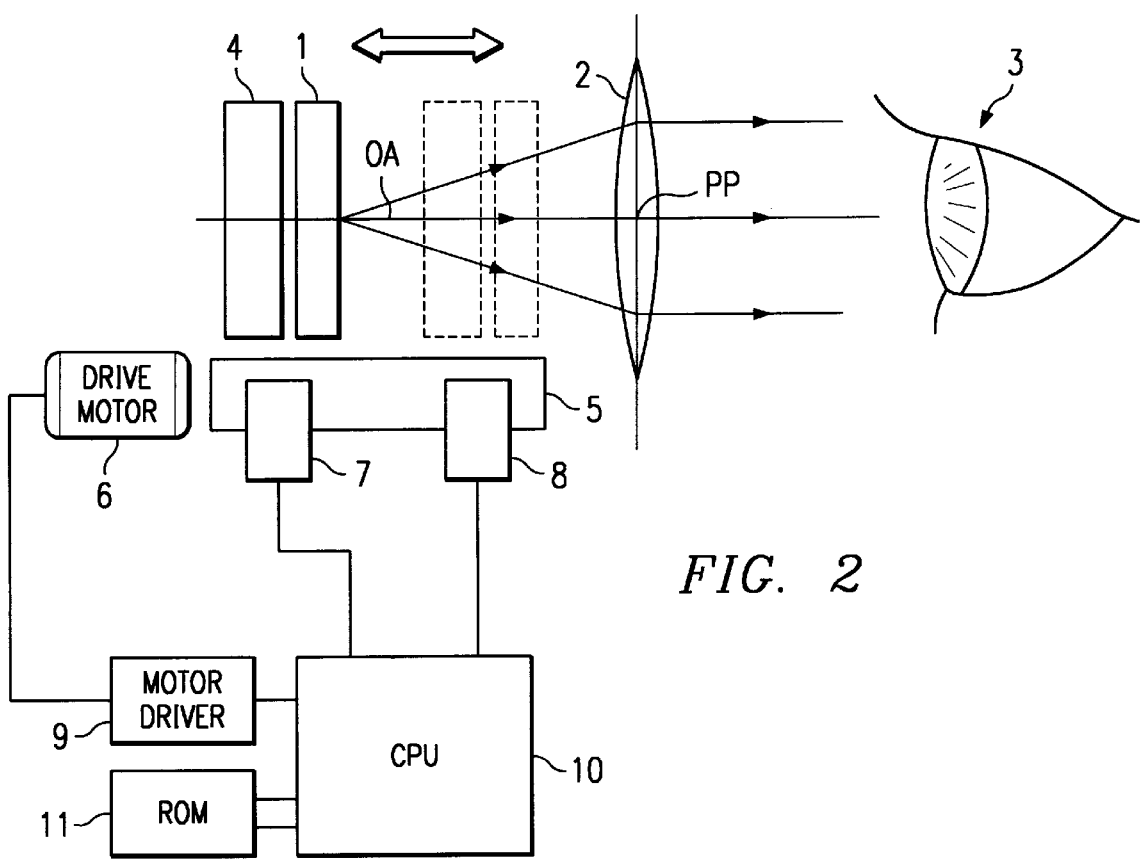
FIG. 2 is a schematic diagram of a display in accordance with an embodiment of the present invention.

The preferred embodiments of the present invention are described hereinafter with reference to FIGS. 2–7 of the accompanying drawings. FIG. 2 is a schematic diagram of a display in accordance with an embodiment of the present invention and shows the optical and electrical construction of a display of a first embodiment of the invention. This display is constructed for use as a head-mounted display (HMD). An electrical signal can be transmitted from an external device (not shown) to the transmissive liquid crystal panel 1 to selectively cause portions of the liquid crystal panel 1 to be opaque and other portions to be transparent, thereby forming an actual image on the liquid crystal panel 1. A lens 2 is positioned on a common optical axis with the liquid crystal panel 1 between the liquid crystal panel 1 and the viewing position for an eye 3 of an observer. The backlight 4 is positioned on the side of the liquid crystal panel 1 which is remote from the lens 2 and illuminates the liquid crystal panel 1 so that light from the backlight 4 passes through the transparent portions of the liquid crystal display 1 and the lens 2 to the observer's eye 3, whereby the lens 2 displays, as a virtual image to the observer's eye 3, the image formed on the liquid crystal panel 1.

A direct-acting guide mechanism 5 is positioned for effecting reciprocating movement along the optical axis OA which is common to the liquid crystal panel 1 and the lens 2. A drive motor 6 is connected to the direct-acting guide mechanism 5 to effect the reciprocating movement of the direct-acting guide mechanism 5 along the optical axis OA. The direct-acting guide mechanism 5 can be any suitable mechanism, with one example being a threaded elongated shaft which is driven by the motor 6 and which extend through a corresponding threaded opening in the frame of the liquid crystal panel 1 in a direction parallel to the optical axis OA, and a guide element which prevents any rotation of the liquid crystal panel 1 with respect to the threaded shaft while permitting the liquid crystal panel 1 to move along the threaded shaft. The rotation of the drive motor 6 directly causes rotation of the threaded shaft, which results in movement of the liquid crystal panel 1 along the threaded shaft. Another type of direct-acting guide mechanism 5 includes a track for movement of the liquid crystal panel 1 along the optical axis OA, and an elongated belt which is driven by the rotation of drive motor 6 and which has one portion of the belt attached to the liquid crystal panel 1. Another type of direct-acting guide mechanism comprises a rack and pinion drive, wherein the rack is positioned parallel to the optical axis OA and is attached to the liquid crystal panel 1 while the pinion, which engages the rack, is driven by the rotation of the drive motor 6 to effect reciprocating movement of the rack and the liquid crystal panel 1.

The liquid crystal panel 1 and the backlight 4 are mounted on the direct-acting guide mechanism 5, so that they can be simultaneously moved forwardly or backwardly along the optical axis OA via the movement of the direct-acting guide mechanism 5.

A back position sensor 7 and a front position sensor 8 are positioned along a line parallel to the optical axis OA so as to detect the presence of the liquid crystal panel 1 at a back detecting position and at a front detecting position, respectively. The back position sensor 7 can be positioned to detect the presence of the liquid crystal panel 1 when the liquid crystal panel 1 is at the desired rearmost position of the guide mechanism 5 (farthest desired distance from the lens 2). Similarly, the front position sensor 8 can be positioned to detect the presence of the liquid crystal panel 1 when the liquid crystal panel 1 is at the desired forwardmost position of the guide mechanism 5 (closest desired distance to the lens 2). While an observer's eye 3 views the virtual image VI, the desired rearmost position for sensor 7 can be determined as being a position just before the moving virtual image begins to appear blurred to the observer's eye 3 while the guide mechanism 5 is moving the liquid crystal panel 1 in the rearward direction away from the lens 2, and the desired forwardmost position for sensor 8 can be determined as being a position just before the moving virtual image begins to appear blurred to the observer's eye 3 while the guide mechanism 5 is moving the liquid crystal panel 1 in the forward direction toward the lens 2. This construction prevents eye fatigue by allowing the observer to normally view the virtual image at a substantially continuously moving position within a range matching the diopter of the observer.

The sensor 7 or 8 outputs a signal to the central processing unit (CPU) 10 when the sensor 7 or the sensor 8 detects the presence of the liquid crystal panel 1 at its respective detecting position, to inform the CPU 10 of the current location of the liquid crystal panel 1. The CPU 10 transmits data to a motor driver circuit 9, which controls the rotation of drive motor 6, so as to cause the drive motor 6 to drive the guide mechanism 5 to move the liquid crystal panel 1 and the backlight 4 along the optical axis OA at the desired timing and at the desired speed. A read only memory (ROM) 11 pre-stores the control programs and the like of CPU 10.

Figure 3:
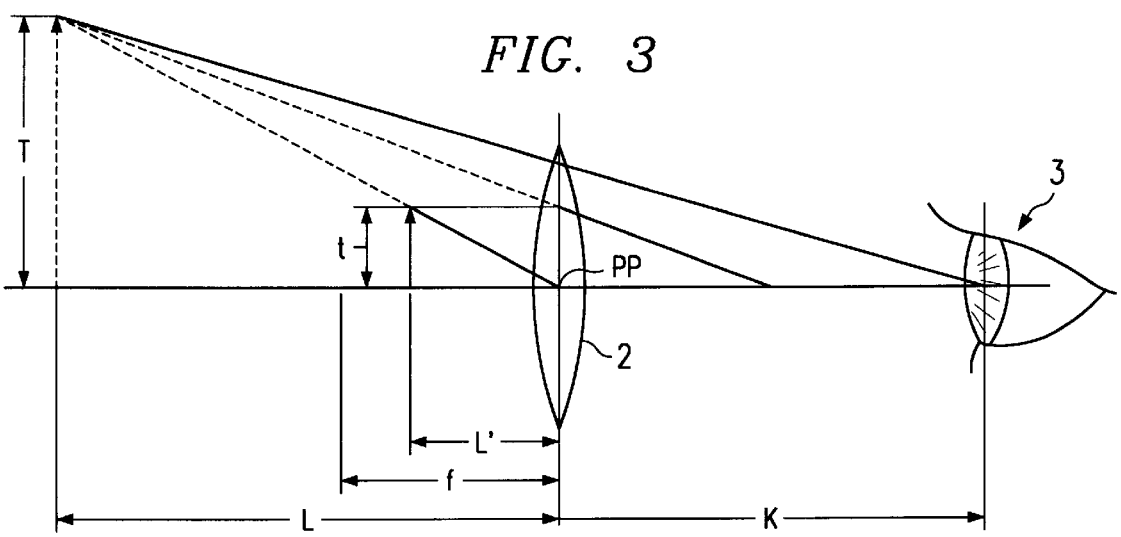
FIG. 3 is a schematic diagram of the optical relationships of elements of the optical system of an embodiment in accordance with the present invention.

FIG. 3 is a schematic diagram of the optical relationships of elements of the optical system of the embodiment of FIG. 2. In a specific embodiment, the liquid crystal panel 1 has a diagonal screen measurement of 0.7 inch, the lens 2 has a focal length f of 46 mm, and the lens 2 is positioned so as to provide a distance K along the optical axis OA of 60 mm between the principal point PP of lens 2 and the pupil of the eye of the observer 3. When the distance along the optical axis OA from the principal point PP of the lens 2 to the position of the observed image VI (i.e., the virtual image) is designated L, and the distance along the optical axis OA from the principal point PP of the lens 2 to the position of the actual image AI (i.e., the image formed on the liquid crystal panel 1) is designated L', the values L and L' satisfy the relational equation (1) below.

$$L = fL'/(f-L') \qquad (1)$$

Figure 4:
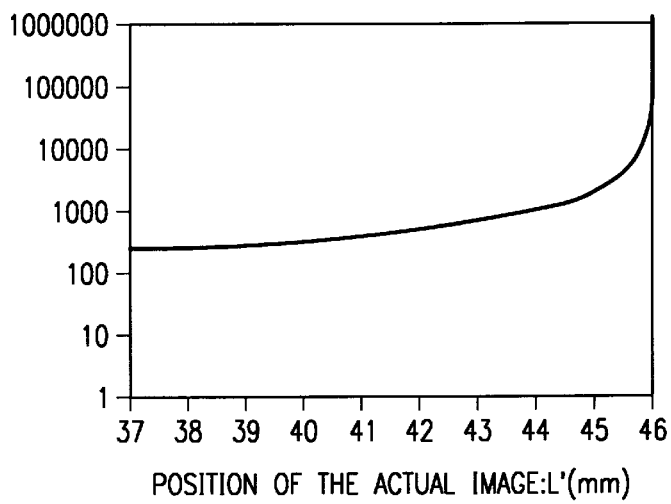
FIG. 4 is a graph illustrating the relationship between an object position and an image position in an embodiment in accordance with the invention.

A graph showing the relationship between L and L' of the relational equation (1) in a range of 37 mm<L'<46 mm is shown in FIG. 4. The distance from the eye 3 of an observer to the observed image VI (i.e., K+L) can be a value in the range of the least distance of distinct vision, i.e., 250 mm, to a distance of infinity, i.e., 6 m or farther, insofar as that value does not burden the eye of the observer. Thus, in the specific embodiment, the position of the liquid crystal panel 1 is movable along the optical axis OA within a range of 37 mm<L'<46 mm from the principal point PP of the lens 2, such that the range in which a virtual image can be suitably viewed by the observer's eye 3 between the end values of the range is limited by the back position sensor 7 and the front position sensor 8. Accordingly, it can be understood from the graph in FIG. 4 that the distance from an observer's eye 3 to the virtual image is a value in the range of 250 mm to infinity (i.e., in the range of 250 mm to 6 m or farther).

The movement of the position of the virtual image VI conversely produces a burden on the eye 3 of the observer when the speed of movement of the position of the virtual image VI is not sufficiently small, particularly as when the position of the virtual image VI is nearer the eye 3 of the observer, i.e., when the value L is small. Experimental results indicate that an observer does not definitely sense image movement when the movement of the liquid crystal panel 1 along the optical axis OA occurs at a uniform motion speed of less than 0.1 mm/sec. In a presently preferred embodiment, therefore, the movement of the liquid crystal panel 1 is selected to be a substantially uniform motion, during a major portion of the range of motion, at a speed of less than 0.1 mm/sec so as to avoid burdening the eye of the observer. It is presently preferred that such major portion extend the length of the range of motion excepting only the distance at each end of the range which is used to slow down the motion to a stop and then to accelerate the motion in the opposite direction. Thus, such major portion will generally be in the range of about 50% to about 95%, and will preferably be in the range of about 80% to about 95% of the total range of motion of the liquid crystal panel 1 represented by the distance between position sensors 7 and 8.

The CPU 10 can be provided with a method of control which provides that the movement of the liquid crystal panel 1 is controlled so as to periodically come to a full stop and remain stopped for a period of time, but which achieves uniform motion at a speed of less than 0.1 mm/sec while moving along a major portion of the range of motion of the liquid crystal panel 1. For example, the liquid crystal panel 1 can stop for a period of 30 seconds at the completion of each reciprocation of the liquid crystal panel 1 (e.g., approximately 90 seconds in the specific embodiment described above). In another example, the liquid crystal panel 1 can proceed through a plurality of cycles of reciprocation for a long period of time, e.g. 15–30 minutes, and then the movement of the liquid crystal panel 1 can be stopped for a rest period, e.g. 30 seconds. It is desirable that the position of the virtual image VI is set at the infinity position for the time the liquid crystal panel 1 is at the stopped position. This method of control effectively reduces eye fatigue by normally moving the position of the virtual image when the virtual image is being viewed for long periods of time.

The CPU 10 can be provided with a method of control which provides that the movement of the liquid crystal panel 1 is controlled so as to periodically interrupt the reciprocation at a slow speed, e.g. less than 0.1 mm per second, and then to move the position of the viewed image at a high speed, e.g. greater than 1 mm per second. For example, the liquid crystal panel 1 can be moved at a high speed for several minutes at the end of each period of low speed motion, e.g. a period of 1 to 2 hours. This method causes the eye of the observer to move (stare in the distance), thus alleviating eye fatigue. Furthermore, the image displayed when the observed image is moved at high speed, can be a specific image.

When the movement of the liquid crystal panel 1 is a uniform motion, the movement of the position of the virtual image VI is not a uniform motion, and the moving speed of the position of the virtual image increases as the position of the virtual image becomes farther away, as can be understood from FIG. 4. It is desirable, however, that the movement of the liquid crystal panel 1 be a substantially uniform motion so that an observer does not sense the movement of the position of the virtual image VI when the position of the virtual image VI is farther away.

Figure 5:
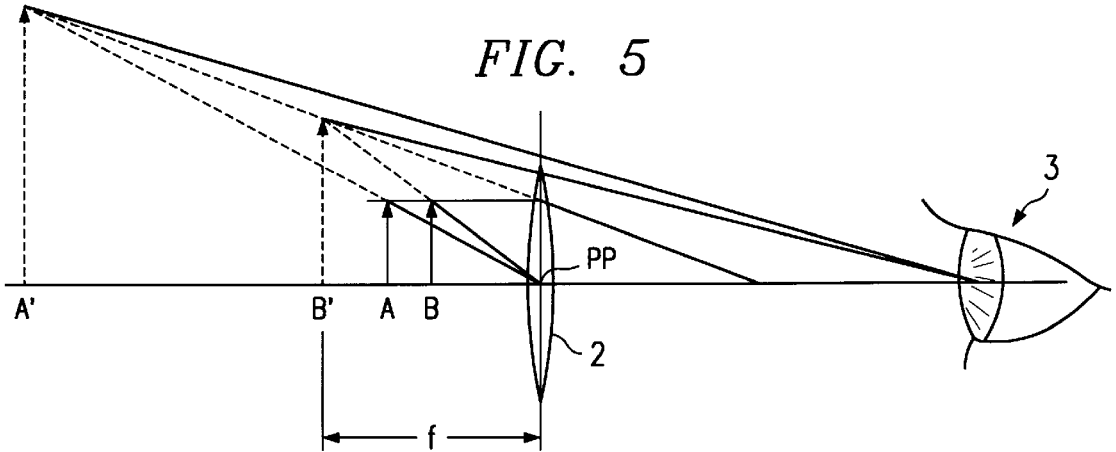
FIG. 5 illustrates the change in size of an image and the image position correlated to a change in the object position.

When liquid crystal panel 1 is moved, the position of the virtual image VI changes and the size of the virtual image VI also changes simultaneously. FIG. 5 illustrates this occurrence. Virtual images which are produced from identical size arrows at the different positions A and B (actual images on the liquid crystal panel 1) are such that the sizes of the virtual images change as the position of the virtual images change, as shown at positions A' and B'. In the present embodiment, however, this is not considered to be a practical problem inasmuch as the movement of the liquid crystal panel 1 is at a sufficiently low speed so as to produce a correspondingly slow change in the size of the virtual image.

Figure 6A:
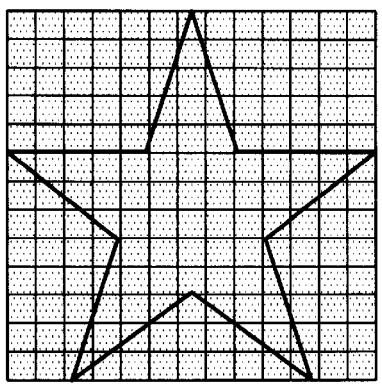
FIG. 6(a) shows the display of the image on the entire display area of the liquid crystal panel when the liquid crystal panel is at a near position B.
Figure 6B:
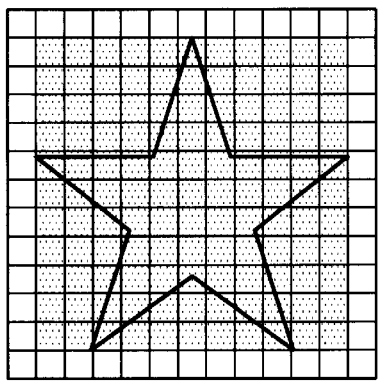
FIG. 6(b) shows the display of the image on only a portion of the display area of the liquid crystal panel when the liquid crystal panel is at a far position A.

When using the display of the present invention in a situation in which the size of the viewed image is of particular importance, the size of the display region can be changed so that the apparent image size remains constant with a change in the position of liquid crystal panel 1, as shown in FIGS. 6a and 6b. As in FIG. 5, the size of the virtual image is smaller when the liquid crystal panel 1 is at the position B (near position) in FIG. 5 than when the liquid crystal panel 1 is at the position A (far position). When the liquid crystal panel 1 is at the position B, the actual image is displayed on a first, large display region of the liquid crystal panel 1 as shown in FIG. 6a, whereas when the panel 1 is at the position (A), the CPU 10 can cause the region for displaying the actual image to be made smaller than the first region as shown in FIG. 6b. If desired, the first region can constitute the entire display region of the liquid crystal panel 1 as shown in FIG. 6a. Thus the size of the apparent image VI viewed by an observer 3 can be maintained constant by means of the adjustment by the CPU 10 of the size of the region utilized to display the actual image.

In the first embodiment, the display is constructed so as to simultaneously move the liquid crystal panel 1 and the backlight 4 in order to move the position of the virtual image VI. Of course, the present invention can also be realized with a display which is constructed to move the lens 2, instead of the liquid crystal panel 1, in order to move the position of the virtual image VI. In such situations, the direct-acting guide mechanism 5 is connected to the lens 2 rather than to the liquid crystal panel 1. The present invention can also be realized with a display which is constructed to use a variable focal length lens as the lens 2 in order to move the position of the virtual image VI without moving either the position of the lens 2 or the position of the liquid crystal panel 1. An example of a variable focal length lens usable in this instance is shown in FIG. 7.

Figure 7:
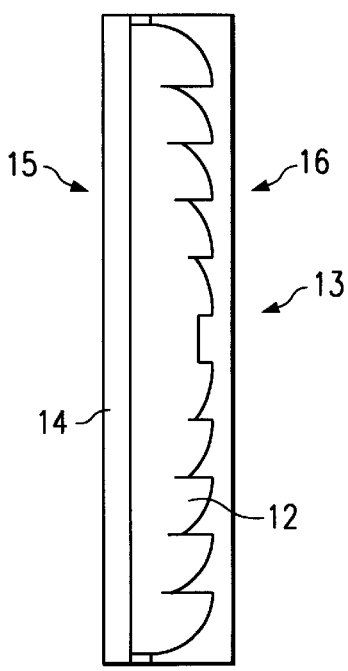
FIG. 7 shows a variable focal length lens.
Figure 8:
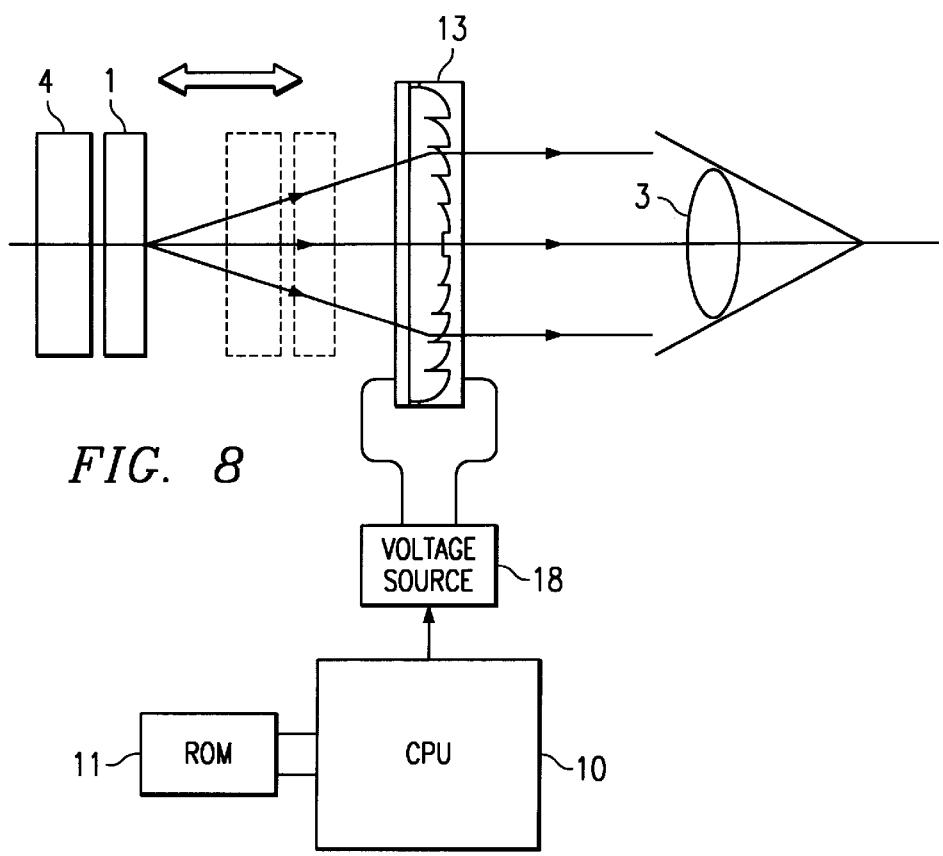
FIG. 8 is a schematic diagram of a display in accordance with an embodiment of the present invention which employs a variable focal length lens.

The variable focal length lens shown in FIG. 7 is a Fresnel lens 13 comprising a liquid crystal layer 12, which is divided into a plurality of concentric circles, wherein the focal point of the Fresnel lens 13 is changed by changing the voltage applied between a transparent electrode 15 on the surface of the glass substrate 14 and a transparent electrode 16 on the opposite surface of the Fresnel lens 13. Using this variable focal length lens, the image position can be changed without requiring a mechanical moving mechanism, thereby making the device lighter and more compact. As shown in FIG. 8, when employing the Fresnel lens 13, the motor driver circuit 9, the drive motor 6, and the direct-acting guide mechanisms can be omitted, and the voltage to be applied across the Fresnel lens 13 can be provided by the CPU 10 controlling a suitable voltage source 18 to provide the desired variation in the voltage across the Fresnel lens 13.

In the first embodiment of the invention, the display is constructed such that a single liquid crystal panel 1 can be viewed monocularly or binocularly. Although not shown in the drawing, the present invention also can be realized by a construction wherein two liquid crystal panels are viewed binocularly. In this instance, for example, two liquid crystal panels can be mounted on a single direct-acting guide mechanism such that each liquid crystal panel is viewed independently, with the matching of the positions of the image of each liquid crystal panel so as to avoid burdening the eyes.

The device of the present invention can be used other than as a display in a head-mounted device, such as shown in FIG. 2, insofar as such device is used to view a virtual image.

The display of the present invention described above reduces the sense of eye fatigue by changing the position of a viewed image at a speed which is unnoticed by an observer even when viewing over long periods of time, as contrasted with long term viewing at a fixed point.

What is claimed is:

1. An image display comprising:
    an image display device for displaying an image;
    an optical system for projecting, as a virtual image, an image displayed by said image display device; and
    a control system for controlling at least one of said image display device and said optical system so as to periodically effect a changing of position of said virtual image as projected by said optical system, each of said periodic changing of position occurring over a predetermined time period.

2. An image display in accordance with claim 1, wherein said image display device comprises:
    a liquid crystal panel; and
    a light source for directing light through transparent portions of an image on said liquid crystal panel;
    wherein said optical system comprises a lens which has a common optical axis with said liquid crystal panel and is positioned to receive light which has been transmitted through said liquid crystal panel; and
    wherein said control system comprises:
        a guide mechanism; and
        a drive element for effecting a movement of at least one of said liquid crystal panel and said lens along said common optical axis.

3. An image display in accordance with claim 2, wherein said control system effects movement of the position of said virtual image, as projected by said optical system, by moving said liquid crystal panel along said common optical axis.

4. An image display in accordance with claim 1, wherein said image display device and said optical system have a common optical axis, and wherein the position of said virtual image as projected by said optical system is changed by moving said image display device along said common optical axis.

5. An image display in accordance with claim 4, wherein, during a changing of position of said virtual image as projected by said optical system, said control system is adapted to effect movement of the image display device along said common optical axis at a speed of less than 0.1 mm/sec.

6. An image display in accordance with claim 1, wherein said image display device and said optical system have a common optical axis, and wherein the position of said virtual image as projected by said optical system is changed by moving at least a portion of said optical system along said common optical axis.

7. An image display in accordance with claim 6, wherein, during a changing of position of said virtual image as projected by said optical system, said control system is adapted to effect movement of said at least a portion of said optical system along said optical axis at a speed of less than 0.1 mm/sec.

8. An image display in accordance with claim 6, wherein said image display device comprises:
    a liquid crystal panel; and
    a light source for directing light through transparent portions of an image on said liquid crystal panel;
    wherein said optical system comprises a lens which has a common optical axis with said liquid crystal panel and is positioned to receive light which has been transmitted through said liquid crystal panel; and
    wherein said control system comprises:
        a guide mechanism; and
        a drive element for effecting a movement of said lens along said common optical axis.

9. An image display in accordance with claim 8, wherein, during a changing of position of said virtual image as projected by said optical system, said control system is adapted to effect movement of said lens along said common optical axis at a speed of less than 0.1 mm/sec.

10. An image display in accordance with claim 1,
    wherein said optical system comprises a variable focal length lens, and
    wherein a position of the virtual image as projected by said optical system is changed by changing a focal point of said variable focal length lens.

11. An image display in accordance with claim 1, wherein said control system controls said at least one of said image display device and said optical system so that said predetermined time period is a period of time required for said at least one of said image display device and said optical system to move along an optical axis, from a first position on said optical axis to a second position on said optical axis, said optical axis extending from said image display device to said optical system.

12. An image display in accordance with claim 11, wherein said control system stops movement of said at least one of said image display device and said optical system when said at least one of said image display device and said optical system reaches one of said first position and said second position, and subsequently effects movement of said at least one of said image display device and said optical system from said one of said first position and said second position to another of said first position and said second position.

13. An image display in accordance with claim 12, wherein said control system comprises:
    a first position sensor positioned to detect a presence of said at least one of said image display device and said optical system at said first position and for outputting a first detection signal;
    a second position sensor positioned to detect a presence of said at least one of said image display device and said optical system at said second position and for outputting a second detection signal;
    a guide mechanism for effecting reciprocating movement of said at least one of said image display device and said optical system;
    a motor for driving said guide mechanism; and
    a controller for receiving said first and second detection signals outputted from said first and second position sensors and for controlling said motor responsive to said first and second signals.

14. An image display in accordance with claim 11, wherein said control system periodically stops said at least one of said image display device and said optical system at at least one of said first position and said second position for a second predetermined time period.

15. An image display in accordance with claim 14, wherein said image display device comprises:
    a liquid crystal panel; and
    a light source for directing light through transparent portions of an image on said liquid crystal panel;
    wherein said optical system comprises:
        a lens which is positioned to receive light which has been transmitted through said liquid crystal panel, each of said lens and said liquid crystal panel being positioned on said optical axis; and wherein said control system comprises:
a guide mechanism;
and a drive element for effecting a movement of one of said liquid crystal panel and said lens along said optical axis.

16. An image display in accordance with claim 15, wherein, during a changing of position of said virtual image as projected by said optical system, said control system effects movement of the liquid crystal panel along said optical axis at a speed of less than 0.1 mm/sec.

17. An image display in accordance with claim 15, wherein, during a changing of position of said virtual image as projected by said optical system, said control system is adapted to effect movement of the lens along said optical axis at a speed of less than 0.1 mm/sec.

18. An image display in accordance with claim 1, wherein said control system controls said at least one of said image display device and said optical system so that said at least one of said image display device and said optical system moves along an optical axis, extending from said image display device to said optical system, between a first position on said optical axis and a second position on said optical axis and periodically stops said at least one of said image display device and said optical system for short intervals of time.

19. An image display in accordance with claim 1, wherein said control system controls said at least one of said image display device and said optical system so that said at least one of said image display device and said optical system moves at a first speed along an optical axis, extending from said image display device to said optical system, between a first position on said optical axis and a second position on said optical axis, and periodically moves said at least one of said image display device and said optical system at a second speed for a short interval of time, said second speed being higher than said first speed.

20. An image display in accordance with claim 19, wherein said first speed is less than 0.1 mm/sec and wherein said second speed is greater than 1 mm/sec.

21. An image display in accordance with claim 1, wherein said control system controls said at least one of said image display device and said optical system so that said at least one of said image display device and said optical system moves at a first speed along an optical axis, between a first position on said optical axis and a second position on said optical axis, said optical axis extending from said image display device to said optical system, said at least one of said image display device and said optical system moving at said first speed from about 50% to about 95% of a distance between said first position and said second position.

22. An image display in accordance with claim 21, wherein said at least one of said image display device and said optical system moves at said first speed from about 80% to about 95% of said distance between said first position and said second position.

23. An image display in accordance with claim 1, wherein said control system controls said at least one of said image display device and said optical system so that said at least one of said image display device and said optical system moves along an optical axis, between a first position on said optical axis and a second position on said optical axis, and periodically stops said at least one of said image display device and said optical system for short intervals of time when a distance between said image display device and said optical system is maximized, said optical axis extending from said image display device to said optical system.

24. An image display in accordance with claim 1, wherein said image display device and said optical system are controlled during said periodic changing of position so that a size of said thus displayed image changes such that an apparent size of said virtual image remains constant.

25. An image display comprising:
an image display device for displaying an image;
an optical system for projecting an image displayed by said image display device as a virtual image; and
a control system for controlling at least one of said image display device and said optical system so as to periodically effect a changing of position of said virtual image as projected by said optical system, each of said periodic changing of position occurring over a predetermined time period,
wherein said control system is adapted to effect movement of said thus controlled at least one of said image display device and said optical system at a speed of less than 0.1 mm/sec.

* * * * *